May 1, 1945.    C. D. HAYWARD    2,374,994
ELECTRIC PROTECTIVE ARRANGEMENT
Filed April 6, 1943    3 Sheets-Sheet 1
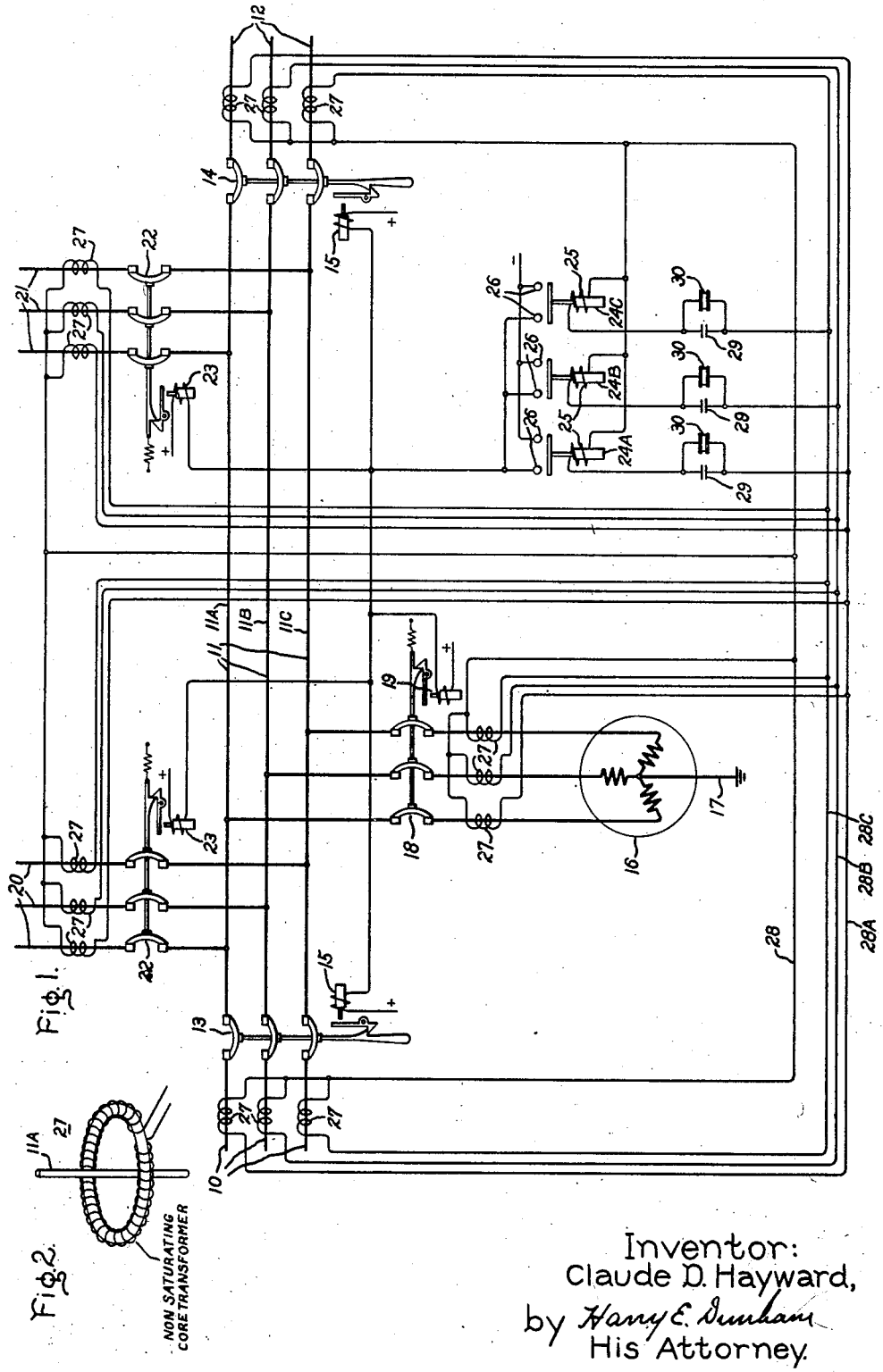
Inventor:
Claude D. Hayward,
by Harry E. Dunham
His Attorney.

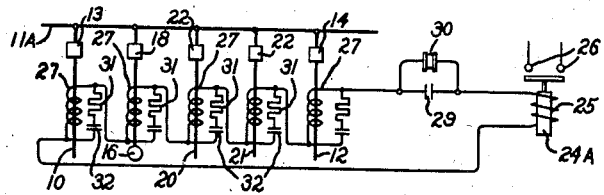
Fig.3.
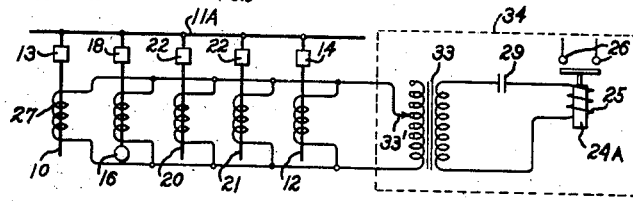
Fig.4.
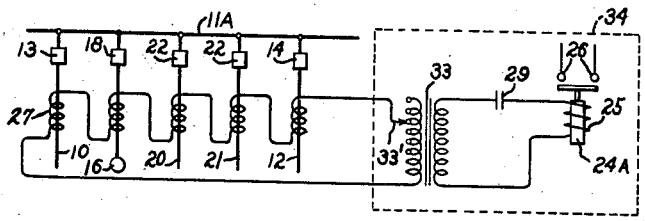
Fig.5.
Fig.6.
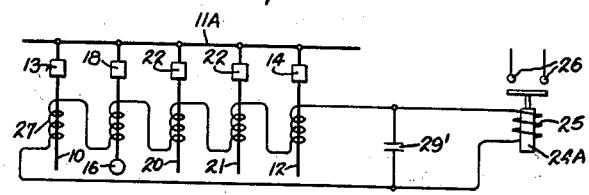
Fig.7.
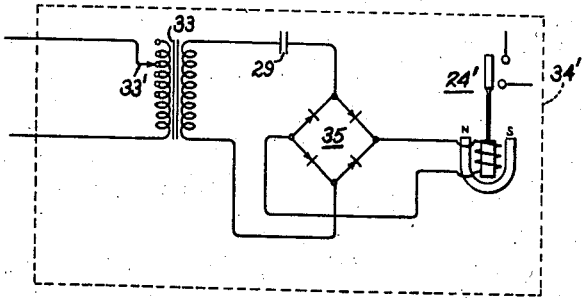

May 1, 1945.  C. D. HAYWARD  2,374,994
ELECTRIC PROTECTIVE ARRANGEMENT
Filed April 6, 1943  3 Sheets-Sheet 3
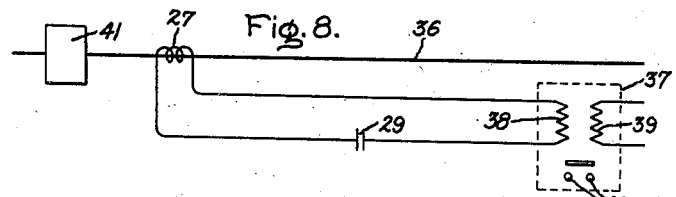
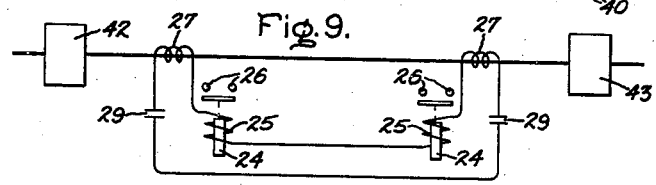
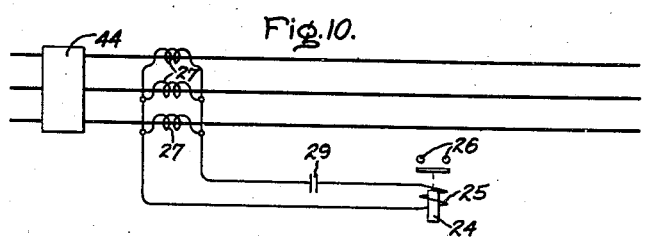
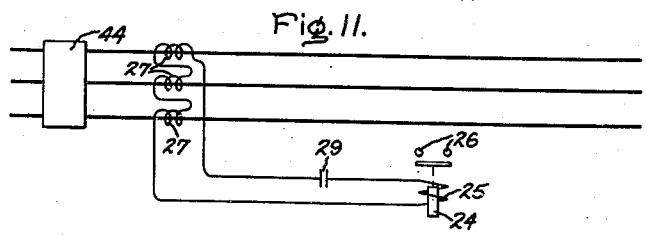
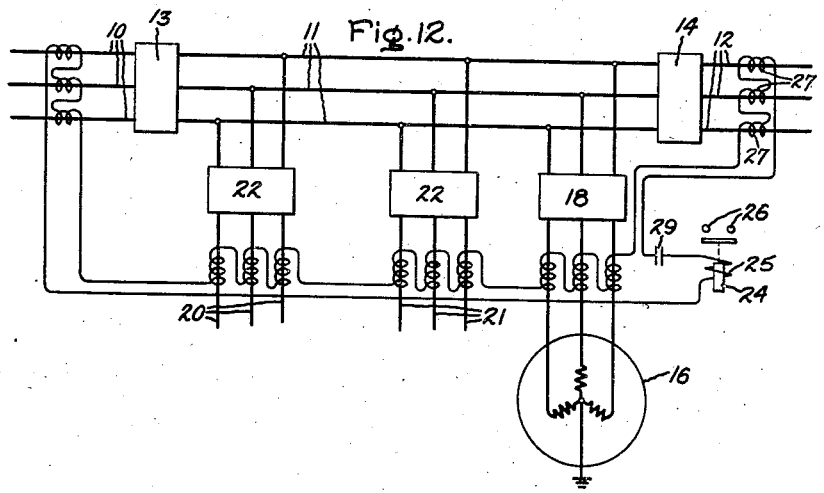
Inventor:
Claude D. Hayward,
by Harry E. Dunham
His Attorney.

Patented May 1, 1945

2,374,994

UNITED STATES PATENT OFFICE 2,374,994

ELECTRIC PROTECTIVE ARRANGEMENT

Claude D. Hayward, Lansdowne, Pa., assignor to General Electric Company, a corporation of New York Application April 6, 1943, Serial No. 482,007

21 Claims. (Cl. 175—294)

My invention relates to protective arrangements for alternating-current power systems and particularly to arrangements for protecting such systems against abnormal conditions, such as faults thereon.

This application is a continuation-in-part of my application, Serial No. 429,925, filed February 7, 1942.

There are two main requirements placed upon a protective system or arrangement to guarantee protection of a given portion of the power system, namely, rapid and unfailing operation when a fault occurs within the protected portion and assurance that it will not operate when faults or heavy loads external to the protected portion of the system cause the flow of high or abnormal currents through the protected portion of the system. In the case of protective arrangements applied to station buses, the second requirement assumes a special importance since bus outages more seriously impair the continuity of service than outages on other portions of the system.

Due to the excessive saturation of the iron cores of conventional current transformers, conventional relays used heretofore have been definitely limited in meeting the above requirements. Such excessive saturation causes the secondary currents of a differentially connected group of current transformers to become unbalanced even though no internal fault exists and such unbalanced current will cause false operation of a protective relay associated with the protective system. Current transformer saturation may be due to several causes, such as a high alternating current due to an external fault or excessive load, a transient direct-current component, or the magnetic field set up by the alternating-current and direct-current components of currents flowing in other conductors near the transformer.

In order to prevent false operation of protective relays on unbalanced current due to saturation of conventional iron-core current transformers, special relays were designed, such as percentage differential relays, induction type relays having a time delay, and harmonic restraint relays. The latter type is disclosed and claimed in my copending application, Serial No. 339,096, filed June 6, 1940, and assigned to the same assignee as the present application. The use of such special relays has been satisfactory where extreme saturation of the current transformer cores is not reached. However, if extreme saturation due to a transient direct current component is reached, as may often be the case on generator buses, the output of the current transformers carrying the full fault current may be reduced practically to zero so that there is no difference in the differential currents for faults just inside or just outside the protected region and, under these conditions, no special type of relay can give correct operation.

In order to limit the core saturation to a value on which reliable relay performance can be obtained, special large sized current transformers having magnetic cores have been constructed to operate very satisfactorily. However, these are objectionable because of the obvious disadvantage of high cost and mounting difficulties resulting from their large size.

In order to eliminate any saturation difficulty, current transformers for use in differential protective systems have been constructed with so-called "air cores," that is, without any magnetic materal in the cores. Such an arrangement is disclosed and claimed in United States Letters Patent 1,760,541, granted May 27, 1930, upon an application of Waldemar Brückel, and assigned to the same assignee as the present application. When the non-magnetic core current transformers of the Brückel patent referred to above are constructed in the well-known toroidal form, as disclosed and claimed in United States Letters Patent 1,766,048, granted June 24, 1930, upon an application of A. M. Trogner, an arrangement is provided in which the current transformers are not only free from saturation but are also unaffected by stray fields. It has long been known and it is easily demonstrated mathematically that an ideal toroidal coil has no external field and hence can have no mutual coupling with any circuit that does not thread through the "window" or "hole" in the toroid. Furthermore, it is well known that the coupling effect with a current-carrying conductor passing through the hole is the same regardless of the position of the conductor in the hole. Non-magnetic core or air-core current transformers whether or not the cores are of toroidal form have not been used extensively however, because the amount of power that can be obtained therefrom is so small that it was heretofore necessary to employ a protective relay of extremely high sensitivity such as one of the polarized type or one using electronic devices, in order to obtain relay operation on minimum internal fault currents.

More recently, as is disclosed in copending application, Serial No. 381,689, filed March 4, 1941, upon an application of Allen T. Sinks, and assigned to the same assignee as the present application, a non-saturating core type of current transformer, generally referred to as the air gap core type current transformer, has been successfully developed for use in differential protective systems, and particularly bus differential protective systems. By avoiding core saturation, these current transformers produce the same desirable effect as the so-called "air core" current transformers with regard to the linear relationship between the primary current and the secondary induced voltage and, consequently, the air core and air gap core current transformers are often referred to as non-saturating core current transformers or linear couplers and, when these terms are used hereinafter, they include both of these types of current transformers in which the linear relationship between the primary current and the secondary induced voltage thereof exists. The air gap core current transformers have the advantage of transforming a sufficient amount of power so that all ordinary relays may be used in connection therewith. However, where the number of air gap core current transformers is large and the minimum fault current is low, it is necessary to make the air gap core current transformers of large physical proportions in order to obtain enough power under such specific situations to operate the protective relays when ordinary relays are used. It would be desirable to provide a differential protective arrangement for a portion of an alternating-current system, such as a station bus, in which non-saturating core current transformers or linear couplers may be used either of the air core or air gap core type in which not only ordinary relatively insensitive relays may be used but in which the physical dimensions and cost of the transformer structure may be kept low.

It is an object of my invention to provide a new and improved protective arrangement for an alternating-current power system.

It is another object of my invention to provide an improved differential protective arrangement for a bus system in which non-saturating core current transformers are utilized together with relatively insensitive protective relays and false operations of the protective relays are substantially eliminated.

Still another object of my invention is to provide a new and improved bus differential protective system in which non-saturating core current transformers or linear couplers are used and the maximum power for operating protective relays therefrom is obtained.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a diagrammatic representation of a protective system embodying my invention; Fig. 2 is a diagrammatic representation of one form of non-saturating core current transformer which may be used with my invention; Figs. 3, 4, 5 and 6 are single-line diagrams illustrating modifications of my invention and Figs. 7, 8, 9, 10, 11 and 12 are schematic diagrams illustrating further modifications of my invention.

A given electroresponsive device requiring a certain amount of power to operate may be made to have different operating or pickup currents simply by winding its operating coil with different numbers of turns of wire. It would seem at first glance, therefore, that an ordinary overcurrent relay could be made to respond when used in connection with a differential protective system to almost any value of internal fault current however low simply by winding the relay coil with a sufficiently large number of turns of wire fine enough to go into the coil space. A more careful consideration, however, shows that the burden imposed upon the current transformers of the differential protective system by the high impedance of such a relay coil will cause the current supplied to the relay to be reduced. It is obvious that, if the impedance of the relay coil is made either infinite or zero, no power will be supplied to the relay and, consequently, it is apparent that there is an optimum value of coil impedance somewhere between zero and infinity at which, for a given number of current transformers and a given fault current, maximum energy will be supplied to a relay. I have found that, by arranging the differential relaying circuits in a predetermined manner, it would be possible to obtain relay operation on fault currents of one-fifth or less than was heretofore possible with conventional differential circuits and, consequently, it is possible not only to use the air gap core current transformer with greater success but the air core current transformer disclosed in the Brückel patent referred to above may now be satisfactorily used without supersensitive relays.

Before setting forth the mathematical analysis involved in my invention, reference may be had to Fig. 1 of the accompanying drawings in which I have chosen to illustrate my invention as applied to a differential protective system for a polyphase alternating-current bus system of which three sections 10, 11, and 12 are schematically shown. Only one section 11 is shown completely since the others are substantial duplicates as far as my invention is concerned and this section 11 is illustrated as a three-phase bus including phase conductors 11A, 11B, and 11C. The bus sections 10, 11 and 12 are shown as interconnected by suitable switching means, such as latched closed circuit breakers 13 and 14, each provided with trip coils 15.

Each bus section, such as 11 for example, may have one or more sources of supply which I have indicated as a Y-connected generator 16 provided with a grounded neutral connection 17. In order to disconnect source 16 from bus section 11 in case of a fault, a suitable switching means such as a circuit breaker 18 is provided having a trip coil 19.

A plurality of feeders, such as 20 and 21 are connected to bus section 11 through suitable switching means, such as latched closed circuit breakers 22 which are provided with trip coils 23.

In order to isolate a faulty bus section, I provide means for effecting the opening of the bus-tie circuit breakers 13 and 14, the source circuit breaker 18, and all the feeder breakers 22 upon the occurrence of a fault on protected section 11. This means comprises phase fault differential relays or electroresponsive devices 24A, 24B, and 24C, each provided with a winding 25, so that energization of any one or more of these relays will cause bridging of the corresponding one or more pairs of the parallel arranged contacts 26 arranged in a control circuit for energizing trip coils 15, 19, and 23 of the associated circuit breakers. The particular construction of the phase fault relays 24A, 24B, and 24C forms no part of the present invention other than that they may be relatively insensitive relays as will be described in greater detail hereinafter. These relays are arranged to be energizd by a current dependent upon the vector sum of all of the currents flowing into and out of the bus section 11 being protected and this differential relay current is obtained from current transformers 27 located at the ends of the bus section in the generator circuit and in the feeder circuits 20 and 21 connected to the bus section 11. A polyphase system is illustrated and, accordingly, a plurality of current transformers 27 are provided at each of the points at which current may flow to or from bus section 11. The secondary windings of these current transformers 27 at any point are illustrated as connected in Y and these Y-connected groups are connected in parallel, phase by phase through conductors 28A, 28B, and 28C, respectively, and a common return conductor 28. The phase fault differential relays 24A, 24B, and 24C have the windings 25 thereof energized across one of the respective conductors 28A, 28B, or 28C and the return conductor 28 associated with the neutrals of the Y-connected current transformers 27.

It will be understood by those skilled in the art that a similar suitable relay device may also be provided to protect against ground faults as will be described in connection with Fig. 12 hereinafter.

Since the general arrangement of the differential bus protective system described thus far is no different from that of conventional differential protective systems, the operation thereof will be obvious to those skilled in the art.

The current transformers 27 schematically illustrated in Fig. 1 should be of the non-saturating core type of current transformers or linear couplers and may either comprise the air gap core type of linear coupler disclosed and claimed in the copending Sinks application referred to above or may be of the toroidal non-magnetic core or air core type of current transformer disclosed in the above-mentioned Trogner patent and schematically illustrated in Fig. 2.

In accordance with my invention, I provide a circuit arrangement for differential relaying in which it is possible to obtain sufficient power from non-saturating core current transformers, such as the type disclosed in Fig. 2, to permit the use of standard overcurrent relays such as those schematically illustrated as 24A, 24B, or 24C, in Fig. 1. If air gap core current transformers are used with the improved relaying circuits to be described hereinafter, it is possible to reduce rather greatly their physical size without any sacrifice in their performance.

The amount of power supplied to an electro-responsive device or relay associated with a differential protective circuit consisting of a given number of non-saturating core current transformers of a given size for a given magnitude of internal fault current is increased to the theoretical maximum by the following two features incorporated in my improved circuit. First, the relaying circuit including the secondary windings of the non-saturating core current transformers or linear couplers for each phase conductor and the associated relay coil or winding are tuned to resonance at the system frequency by means of a capacitor 29 in effect to neutralize the reactive component of the overall circuit impedance leaving only the resistive component to limit the current. Since the reactance is usually five or six times as large as the resistance, its neutralization by tuning increases the relay current for a given internal fault current by a factor of the same order. Since the power supplied to the relay is proportional to the square of the current flowing, this power is thus increased by a factor of twenty-five or thirty. The second of these features permits the power delivered to the relay under the tuned condition mentioned above to be increased to the maximum obtainable by making the alternating-current resistance of the relay equal to the alternating current resistance of the remainder of the secondary differential circuit as viewed from the relay terminals. It can be shown that, when these two conditions in the relay circuit are met, the minimum internal fault current in primary amperes with reference to the non-saturating core current transformers required to operate the relay is expressed by the following equation:

$$I = 2\frac{\sqrt{R_T N W}}{X_m} \quad (1)$$

where I is the required minimum primary current in amperes, $X_m$ is the mutual reactance of each non-saturating core current transformer in ohms, $R_T$ is the secondary winding resistance of each non-saturating core current transformer in ohms, N is the number of current transformers connected in the differential circuit in so far as any one phase is concerned, and W is the power in watts required to operate the differential relay. The two conditions necessary to obtain this for an arrangement such as is shown in Fig. 1 in which the non-saturating core current transformers or linear couplers are connected in parallel may be expressed mathematically by the following two equations:

$$R_R = \frac{R_T}{N} \quad (2)$$

$$X_C - X_R = \frac{X_T}{N} \quad (3)$$

where $R_R$ is the resistance of the relay coil in ohms, $X_C$ is the capacitive reactance of the capacitor 29 in ohms, $X_R$ is the inductive reactance of the relay coil in ohms, and $X_T$ is the secondary winding inductive reactance of each non-saturating core current transformer in ohms. The resistance quantities in the above mentioned equations and elsewhere in the specification and claims of this application should be understood to mean the alternating current resistance rather than the resistance which would be measured by direct current means. The alternating current resistance of a portion of a circuit for a given frequency is defined as the quotient obtained by dividing the power in watts, absorbed by the portion of the circuit when an alternating current of the given frequency flows through it, by the square of the current magnitude in amperes.

In developing these relationships, the resistance and inductance of the connecting leads between the current transformers and the relay were neglected in order to simplify the equations. In practice, the lead resistance should be kept as low as practicable and in matching the resistance and reactance of the relay against that of the current transformers, the lead resistance should be considered as being in the current transformers rather than in the relay since it is desired to obtain maximum energy in the relay.

It is immaterial where the lead reactance is considered as being located since it is neutralized by means of capacitor 29.

In Fig. 1, I have illustrated a plurality of capacitors 29 each connected in series with a winding 25 of associated relays 24A, 24B, and 24C. The capacitors 29 have such a value of capacitive reactance that the relaying circuit is tuned to resonance at the system frequency. Furthermore, the resistance $R_R$ of windings 25 is equal to one-fifth of the secondary resistance of each of the five current transformers 27, thereby also satisfying Equation 2 above. With this arrangement, relatively insensitive overcurrent relays may be utilized, thereby permitting satisfactory use of non-saturating core current transformers which heretofore required either very sensitive relays or a large and expensive design.

In order to limit the voltage across the capacitors 29 it is preferable to connect a voltage-limiting device, such as a glow discharge tube or, as illustrated in Fig. 1, a resistor 30 constructed of a resistance material having the property of decreasing its resistance with an increase of applied voltage, generally referred to as having an inverse-voltage-resistance characteristic is connected across each capacitor 29 to by-pass a portion of the currents when they reach such a value as would cause a dangerously high voltage to appear across capacitors 29. One such resistance material is commercially available under the trade name "Thyrite" and is described and claimed in United States Letters Patent 1,822,742, granted September 8, 1931, upon an application of Karl B. McEachron, and assigned to the same assignee as the present application. It is assumed that, in the arrangement disclosed in Fig. 1, the voltage developed across the relay coils 25 will not be excessive but it should be understood that a resistance, such as 30, may also be connected across the relay coils or a single resistance, such as 30, may be connected across both the capacitor 29 and relay winding or coil 25. Similarly, the voltage of the individual non-saturating current transformers appearing across the secondary windings thereof may also be limited by suitable means, one of which is specifically disclosed in Fig. 3 to be described hereinafter. It should be understood that, although the use of a resistance material such as "Thyrite" referred to above detunes the relaying circuit at the higher current ranges, this is relatively unimportant since substantially no current is by-passed therethrough in the neighborhood of the pickup current of the relay where it is desirable to get all current possible into the relay and, consequently, this will have no detrimental effect.

Although I have thus far disclosed my invention in connection with a differential relaying current circuit in which the non-saturating core current transformers or linear couplers are connected in parallel, it is equally well adapted for use in a differential relaying circuit in which the non-saturating core current transformers are connected in series and it can be shown that Equation 1 above applies equally well to such series arrangement. However, for the series arrangements, the relationships between the resistances and reactances should be those expressed by Equations 4 and 5 below rather than those expressed by Equations 2 and 3 above:

$$R_R = NR_T \quad (4)$$

$$X_C - X_R = NX_T \quad (5)$$

If the relay winding 25 is designed and the value of the capacitor 29 is selected as indicated by these equations, the same maximum value of relay power will be obtained and Equation 1 may again be used to calculate the minimum primary current required to operate the relay. In Fig. 3, a one-line diagram of a differential protective system similar to Fig. 1 is disclosed except that the non-saturating core current transformers are arranged in series. The corresponding parts of Fig. 3 are designated by the same reference numeral as in Fig. 1. In Fig. 3, the capacitance 29 should have such a value as to tune the series relaying circuit to resonance at the system frequency, as indicated by Equation 5 and the alternating current resistance of the relay coil 25 should be equal to the sum of the resistances of the secondary windings as indicated by Equation 4.

In order to limit the voltage appearing across the secondary winding of the non-saturating core current transformers, I have illustrated in Fig. 3 a serially arranged resistance 31 and capacitance 32 connected across each secondary winding of each individual linear coupler 27. Only a very small value of capacitance will be necessary for surge protection in this case and it will not appreciatively change the current output of the non-saturating core current transformers in so far as this output at commercial frequency is concerned. The capacitance 32 will prevent overvoltages due to surges causing steep front current waves and the resistance 31 is provided to damp out more quickly the consequent oscillations.

It should be noted that the factor N (the number of non-saturating core current transformers) occurs in the same manner in Equations 2 and 3 for the parallel connection and also in the same manner in Equations 4 and 5 for the series connection although it occurs in the reciprocal relationship in so far as a comparison of Equations 2 and 4 and Equations 3 and 5 is concerned. This means that it is possible by using a suitable coupling device, as for example, a transformer 33 having a movable plug 33' as shown in Figs. 4 and 5, to match the resistance of the relaying circuit and at the same time to tune the inductance thereof by means of a single adjustment. In other words, it is possible to build a universal relay generally indicated by the dotted line 34 in Figs. 4 and 5 which may be used with any system irrespective of the number of non-saturating core current transformers connected in series or in parallel in the particular relaying circuit. Each position of movable plug 33' of transformer 33 which, incidentally, may be an auto transformer or a two-winding transformer having the taps thereof provided on the secondary winding or as shown in Figs. 4 and 5 on the primary winding, may be marked with the number of current transformers with which the relay will match when the plug 33' is in that position. With the parallel connection of current transformers illustrated in Fig. 4, the full winding tap of the transformer 33 will be used for matching with the minimum number of current transformers since, as is obvious from Equations 2 and 3, the current transformer number factor N occurs in the reciprocal relation 1/N. Where the non-saturating core current transformers 27 are connected in series as in Fig. 5, the winding taps of transformer 33 will be arranged so that the full winding tap will be used for matching with the maximum number of current transformers in view of the fact that the constants of the relay winding are directly proportional to the number of current transformer windings connected in series as indicated by Equations 4 and 5.

When a transformer, such as 33 is utilized, it is unnecessary to provide means for limiting the voltage appearing across capacitor 29 or relay winding 25 under extreme fault conditions since the transformer 33 may be constructed with a core which will saturate at high current values, thereby affording complete protection.

It should be understood by those skilled in the art that, when a matching transformer such as 33 is used with the taps on either the primary or secondary thereof or a tapped auto transformer, the equivalent resistance and leakage reactance of such transformer must be taken into account in arranging the constants of the relaying circuit.

It is also possible to increase the power supplied to the relay by using a capacitor in parallel with the relay winding 25 rather than in series therewith as is shown in Figs. 1, 3, 4 and 5. Accordingly, in Fig. 6, I have illustrated a circuit similar to Fig. 3 with the corresponding parts thereof designated by the same reference numerals, in which a capacitor 29' is connected in parallel with relay winding 25 in place of the series capacitor 29 described heretofore. The relay and capacitor arrangement of Fig. 6 may be used with either the series or parallel arrangement of current transformers. The method of tuning is different than in the case of the series capacitor. The capacitor is selected to have a capacitive susceptance equal to the sum of the inductive susceptance of the relay coil and the inductive susceptance of the parallel or series connected group of current transformers. Also instead of matching the resistances as in the case of the series capacitor arrangement, the conductance of the relay coil is made equal to the conductance of the group of series or parallel connected current transformers. The conductance of a circuit part, expressed in ohms is defined as the quotient obtained by dividing its resistance in ohms by the square of its impedance in ohms. The susceptance, also expressed in ohms, is defined as the quotient obtained by dividing the reactance in ohms by the square of the impedance in ohms. Hence the two conditions for maximum relay power may be expressed mathematically by the following equations, 6 and 7, which apply to an arrangement such as is shown in Fig. 6 in which the non-saturating core current transformer windings are connected in series:

$$\frac{R_R}{R_R^2 + X_R^2} = \frac{NR_T}{(NR_T)^2 + (NX_T)^2} \quad (6)$$

$$\frac{1}{X'_C} = \frac{X_R}{R_R^2 + X_R^2} + \frac{NX_T}{(NR_T)^2 + (NX_T)^2} \quad (7)$$

where $X'_C$ is the capacitive reactance of the capacitor 29' in ohms and the other terms have the same values as defined for Equations 1, 2, 3, 4 and 5. When the conditions expressed by Equations 6 and 7 are satisfied the minimum primary current required to operate the relay is again given by Equation 1.

For a circuit arrangement similar to Fig. 6 in having the capacitor 29' connected in parallel with the relay coil 25 but having the non-saturating core current transformer windings 27 connected in parallel as illustrated in Figs. 1 and 4 instead of in series the conditions to be satisfied are expressed by the equations:

$$\frac{R_R}{R_R^2 + X_R^2} = \frac{\frac{R_T}{N}}{\left(\frac{R_T}{N}\right)^2 + \left(\frac{X_T}{N}\right)^2} \quad (8)$$

$$\frac{1}{X'_C} = \frac{X_R}{R_R^2 + X_R^2} + \frac{\frac{X_T}{N}}{\left(\frac{R_T}{N}\right)^2 + \left(\frac{X_T}{N}\right)^2} \quad (9)$$

If desired, a more sensitive relay may, of course, be utilized with such a differential relaying circuit and, accordingly, in Fig. 7 I have illustrated a universal relay 34' in which the corresponding parts thereof are designated by the same reference numerals as those in Figs. 4 and 5. Instead of an ordinary overcurrent relay 24A, however, a polarized relay schematically illustrated at 24' may be provided and, since such a relay requires direct-current energization, a suitable full-wave rectifier 35 is provided between transformer 33 and polarized relay 24'. It will be understood that other types of sensitive alternating-current or direct-current relays could equally well be used and, with such sensitive relays, there will result a protective system responsive to much lower fault currents. However, my invention is primarily concerned with an arrangement in which relatively insensitive relays, such as overcurrent relays 24A, 24B, or 24C of Fig. 1, may be used in a system in which, in accordance with my invention, the relaying energy may be increased twenty-five to thirty times. It will be observed that in the above described arrangements the reactances and resistances of the transformer secondary windings, of the connected electric circuit means, and of the relay winding are coordinated to obtain substantially maximum power supplied to the relay winding.

Although my invention is particularly applicable to differential bus protective systems, it is also applicable to general relaying arrangements. In Fig. 8, for example, I have disclosed a non-saturating core current transformer 27 having the secondary winding thereof connected to the current winding 38 of a directional relay 37 which also includes a potential winding 39. Directional relay 37 is adapted to control contacts 40 which are connected in the controlling circuit for controlling circuit breaker 41 associated with a protected section 36 of a power system. A capacitor 29 is provided to tune the relaying circuit to resonance and the resistance of winding 38 is chosen so as to match the remaining resistance of the relaying circuit in the same manner as was described heretofore. Although relay 37 has been described as a directional relay it should be understood that it might equally well be an impedance, reactance, overcurrent, etc., type of relay.

In Fig. 9, I have disclosed an application of my invention to a pilot-wire protective system in which the circuit breakers 42 and 43 schematically shown are operated to isolate the protected section. A pair of relays 24 having windings 25 for controlling contacts 26 are connected in a pilot circuit including non-saturating core current transformers 27. Suitable capacitors 29 are provided for tuning the pilot-wire circuit to resonance at the system frequency and, as has been disclosed heretofore, the resistance of the two relay windings 25 are chosen so as to match the resistance of the remainder of the relaying circuit, whereby maximum power for relaying is obtained. It will be obvious from Fig. 9 that a single capacitor could be used for tuning instead of two capacitors as shown. However, by using two substantially identical capacitors with two substantially identical non-saturating core current transformers and two substantially identical relay windings 25, the potential difference between the two pilot wires is made a minimum.

My invention is also applicable to ground-fault protection and, in Fig. 10, I have disclosed a three-phase system in which a circuit breaker schematically indicated at 44 may be controlled in response to a ground fault condition on the associated system by operation of relay 24 having a winding 25 and contacts 26. A plurality of non-saturating core current transformers are connected in parallel with one another and the output thereof is connected across winding 25 of relay 24. A series capacitor 29 is provided for tuning the relaying circuit to resonance at the system frequency and the resistance of winding 25 is chosen so as to match the resistance of the remaining relaying circuit in the same manner as was described in connection with Equations 2 and 3 above.

The series arrangement of current transformers is indicated in Fig. 11 in which the corresponding parts thereof are designated by the same reference numerals as in Fig. 10.

In Fig. 12, I have illustrated schematically the same bus system as in Fig. 1 with the corresponding parts thereof designated by the same reference numerals. Ground-fault protection is provided by connecting all of the transformers for all of the phases in series with one another to energize a relay 24. As in the above-described arrangements, the resistance of the relay 25 is chosen so as to match the resistance of the remainder of the relaying circuit and a capacitor 29 is provided to tune the relaying circuit to resonance at the system frequency. It should be understood that, although Fig. 12 discloses a ground fault protective arrangement in which all of the non-saturating core current transformers are connected in series, these transformers might also all be arranged in parallel or a series-parallel combination might be utilized.

It was found when deriving Equations 2, 4, 6 and 8 above that two values of resistance $R_R$ of equal magnitude were obtained, one having a positive sign as used in these equations and the other a negative sign. Consequently, if means are provided to insert a "negative resistance" in the circuit analogous to the negative reactance inserted by means of a capacitor, the power supplied to the relay winding can be greatly increased. Means for inserting the effect of a negative resistance into the circuit are known to those skilled in the art.

While I have shown and described certain particular embodiments of my invention, it will be apparent to those skilled in the art that my invention has other applications and that changes and modifications may be made without departing from the spirit and scope of my invention, and I, therefore, aim in the appended claims to cover all such changes and modifications.

What I claim as new and desire to secure by Letters Patent of the United States, is:

1. A protective arrangement for an electric system including a plurality of current transformers of the non-saturating core type located at different points on said system, an electroresponsive device connected so as to be energized from said current transformers in response to the vector sum of the currents flowing at different points on said system, and means for substantially neutralizing the overall reactance of the circuit including said transformers and said electroresponsive device so as to reduce greatly the impedance to the current flowing in said electroresponsive device, whereby a relatively insensitive electroresponsive device may be utilized.

2. In a protective arrangement for an alternating current system, the combination of a non-saturating core current transformer having a primary winding and a secondary winding, means for energizing said primary winding from said alternating current system, a relay having a winding thereon, and means for energizing said relay winding from the secondary winding of said transformer, said relay winding being so constructed that the resistance thereof is equal to the resistance of the remainder of the relaying circuit including the secondary winding of said non-saturating core current transformer, whereby the power supplied to said relay winding is greatly increased so that a relatively insensitive relay may be utilized.

3. In a protective arrangement for an alternating current system, the combination of a non-saturating core current transformer having a primary winding and a secondary winding, means for energizing said primary winding from said alternating-current system, an electroresponsive device having a winding energized from the secondary winding of said transformer, and means for tuning the circuit including the winding of said electroresponsive device and the secondary winding of said transformer to resonance at the frequency of said system, said winding of said electroresponsive device being constructed so that the resistance thereof is equal to the resistance of the remainder of the circuit including the secondary winding of said transformer, whereby the power supplied to said winding of said electroresponsive device is a maximum.

4. In a protective arrangement for an alternating current system, the combination of a non-saturating core current transformer having a primary winding and a secondary winding, means for energizing said primary winding from said alternating current system, an electroresponsive device having a winding energized from the secondary winding of said transformer, and a capacitor connected in series with said winding of said electroresponsive device for tuning the circuit including the winding of said electroresponsive device and the secondary winding of said transformer to resonance at the frequency of said system, said winding of said electroresponsive device being constructed so that the resistance thereof is equal to the resistance of the remainder of the circuit including the secondary winding of said transformer, whereby the power supplied to said winding of said electroresponsive device is a maximum.

5. In a protective arrangement for an alternating current system, the combination of a non-saturating core current transformer having a primary winding and a secondary winding, means for energizing said primary winding from said alternating current system, an electroresponsive device having a winding energized from the secondary winding of said transformer, and a capacitor connected in parallel with said winding of said electroresponsive device for tuning the circuit including the winding of said electroresponsive device and the secondary winding of said transformer to resonance at the frequency of said system, said winding of said electroresponsive device being constructed so that the conductance thereof is equal to the conductance of the remainder of the circuit including the secondary winding of said transformer, whereby the power supplied to said winding of said electroresponsive device is a maximum.

6. In a protective arrangement for an alternating current electric system including a plurality of current transformers of the non-saturating core type located at different points on said system, an electroresponsive device having a winding connected so as to be energized from said current transformers in response to the vector sum of the currents flowing at different points on said system, and a capacitor for substantially neutralizing the inductive reactance of the circuit including the transformers and said electroresponsive device, said winding of said electroresponsive device being constructed so that the resistance thereof is equal to the resistance of the remainder of the circuit including said current transformers, whereby the power supplied to said winding of said electroresponsive device is a maximum.

7. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in series with each other, an electroresponsive device including a winding, means for energizing the winding of said electroresponsive device from the serially arranged secondary windings of said current transformers, and means for substantially neutralizing the inductive reactance of the circuit including the serially arranged secondary windings of said current transformers and the winding of said electroresponsive device so as to reduce greatly the impedance to the current flowing in said winding of said electroresponsive device, whereby a relatively insensitive electroresponsive device may be utilized.

8. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in parallel with each other, an electroresponsive device having a winding, means for energizing the winding of said electroresponsive device from the parallelly arranged secondary windings of said current transformers, and means for substantially neutralizing the inductive reactance of the circuit including the parallelly arranged secondary windings of said current transformers and the winding of said electroresponsive device so as to reduce greatly the impedance to the current flowing in said winding of said electroresponsive device, whereby a relatively insensitive electroresponsiv device may be utilized.

9. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in series with each other, an electroresponsive device having a winding, means for energizing the winding of said electroresponsive device from the serially arranged secondary windings of said current transformers, and a capacitor for substantially neutralizing the inductive reactance of the circuit including the serially arranged secondary windings of said current transformers and the winding of said electroresponsive device, said winding of said electroresponsive device being constructed so that the resistance thereof is equal to the resistance of the remainder of the circuit including the serially arranged secondary windings of said current transformers, whereby the power supplied to said winding of said electroresponsive device is a maximum.

10. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in parallel with each other, an electroresponsive device having a winding, means for energizing the winding of said electroresponsive device from the parallelly arranged secondary windings of said current transformers, and a capacitor for substantially neutralizing the inductive reactance of the circuit including the parallelly arranged secondary windings of said current transformers and the winding of said electroresponsive device, said winding of said electroresponsive device being constructed so that the resistance thereof is equal to the resistance of the remainder of the circuit including the parallelly arranged secondary windings of said current transformers, whereby the power supplied to said winding of said electroresponsive device is a maximum.

11. In a protective arrangement for an alternating current electric system including a plurality of current transformers of the non-saturating core type located at different points on said system, an electroresponsive device having a winding connected so as to be energized from said current transformers in response to the vector sum of the currents flowing at different points on said system, a capacitor for substantially neutralizing the inductive reactance of the circuit including the transformers and said electroresponsive device, said winding of said electroresponsive device being constructed so that the resistance thereof is equal to the resistance of the remainder of the circuit including said current transformers, whereby the power supplied to said winding of said electroresponsive device is a maximum, and means for limiting the voltage across said capacitor.

12. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in series with each other, an electroresponsive device having a winding, means for energizing the winding of said electroresponsive device from the serially arranged secondary windings of said current transformers, a capacitor for substantially neutralizing the inductive reactance of the circuit including the serially arranged secondary windings of said current transformers and the winding of said electroresponsive device, said winding of said electroresponsive device being constructed so that the resistance thereof is equal to the resistance of the remainder of the circuit including the serially arranged secondary windings of said current transformers, whereby the power supplied to said winding of said electroresponsive device is a maximum, and means for limiting the voltage across said capacitor.

13. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in parallel with each other, an electroresponsive device having a winding, means for energizing the winding of said electroresponsive device from the parallelly arranged secondary windings of said current transformers, a capacitor for substantially neutralizing the inductive reactance of the circuit including the parallelly arranged secondary windings of said current transformers and the winding of said electroresponsive device being constructed so that the resistance thereof is equal to the resistance of the remainder of the circuit including the parallelly arranged secondary windings of said current transformers, whereby the power supplied to said winding of said electroresponsive device is a maximum, and means for limiting the voltage across said capacitor.

14. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in series with each other, an electroresponsive device having a winding, means for energizing the winding of said electroresponsive device from the serially arranged secondary windings of said current transformers, means for substantially neutralizing the inductive reactance of the circuit including the serially arranged secondary windings of said current transformers and the winding of said electroresponsive device so as to reduce greatly the impedance to the current flowing in said winding of said electroresponsive device, whereby a relatively insensitive electroresponsive device may be utilized, and means for limiting the potential which may exist across said last-mentioned means.

15. In a protective arrangement for an alternating current electric system including a plurality of current transformers of the non-saturating core type each having a primary and a secondary winding, means for connecting said primary windings of said current transformers so as to be energized in response to the current flowing at different points on said system, means for connecting the secondary windings of said current transformers in parallel with each other, an electroresponsive device having a winding, means for energizing the winding of said electroresponsive device from the parallelly arranged secondary windings of said current transformers, means for substantially neutralizing the inductive reactance of the circuit including the parallelly arranged secondary windings of said current transformers and the winding of said electroresponsive device so as to reduce greatly the impedance to the current flowing in said winding of said electroresponsive device, whereby a relatively insensitive electroresponsive device may be utilized, and means for limiting the potential which may exist across said last-mentioned means.

16. In a protective arrangement for an alternating current system, the combination of a current transformer having a primary winding and a secondary winding, means for energizing said primary winding from said alternating current system, an electroresponsive device having a winding energized from the secondary winding of said transformer, and means for tuning the circuit including the winding of said electroresponsive device and the secondary winding of said transformer to resonance at the frequency of said system, said winding of said electroresponsive device being constructed so that the resistance thereof is equal to the resistance of the remainder of the circuit including the secondary winding of said transformer, whereby the power supplied to said winding of said electroresponsive device is a maximum.

17. In a protective arrangement for an alternating current system, the combination of a current transformer having a primary winding and a secondary winding, means for energizing said pirmary winding from said alternating current system, a relay having a winding thereon, and means for energizing said relay winding from the secondary winding of said transformer, said relay winding being so constructed that the resistance thereof is equal to the resistance of the remainder of the relaying circuit including the secondary winding of said current transformer, whereby the power supplied to said relay winding is greatly increased so that a relatively insensitive relay may be utilized.

18. In a protective arrangement for an alternating current electric system including a plurality of current transformers of the non-saturating core type each having a primary and a secondary winding, means for connecting said primary windings of said current transformers so as to be energized in response to the current flowing at different points on said system, an electroresponsive device including a winding, means for energizing the winding of said electroresponsive device from the secondary windings of said current transformers, means for substantially neutralizing the inductive reactance of the circuit including the secondary windings of said current transformers and the winding of said electroresponsive device so as to reduce greatly the impedance to the current flowing in the winding of said electroresponsive device, and an inductive device including a tapped winding interposed between said last-mentioned means and the secondary windings of said transformers to enable said last-mentioned means to neutralize the reactance of the secondary windings of said transformers and the winding of said electroresponsive device independently of the number of current transformers involved merely by adjusting the tapped winding of said inductive device.

19. In a protective arrangement for an alternating current electric system including a plurality of current transformers of the non-saturating core type each having a primary and a secondary winding, means for connecting said primary windings of said current transformers so as to be energized in response to the current flowing at different points on said system, an electroresponsive device including a winding, means for energizing the winding of said electroresponsive device from the secondary windings of said current transformers, means for substantially neutralizing the inductive reactance of the circuit including the secondary windings of said current transformers and the winding of said electroresponsive device, said winding of said electroresponsive device being constructed so that the resistance thereof has a definite relationship to the resistance of the remainder of the circuit including the secondary windings of said current transformers, and an inductive device including a tapped winding interposed between said last-mentioned means and the secondary windings of said transformers to enable said last-mentioned means to neutralize the reactance of the secondary windings of said transformers and the winding of said electroresponsive device and to match the resistance of said winding of said electroresponsive device with the remainder of the circuit including the secondary windings of said current transformers independently of the number of current transformers involved merely by adjusting the tapped winding of said inductive device.

20. In a protective arrangement for an alternating current system, the combination of a current transformer having a primary winding and a secondary winding, means for energizing said primary winding from said alternating current system, an electroresponsive device having a winding energized from the secondary winding of said transformer, and means for tuning the circuit including the winding of said electroresponsive device and the secondary winding of said transformer to resonance at the frequency of said system so as to reduce greatly the impedance to the current flowing in said electroresponsive device, whereby a relatively insensitive electroresponsive device may be utilized.

21. In a protective arrangement for an alternating current system the combination of a non-saturating core current transformer having a primary winding and a secondary winding, means for energizing said primary winding from said alternating current system, an electroresponsive device having a winding thereon, and electric circuit means including a capacitor for energizing the winding of said electroresponsive device from the secondary winding of said transformer, the reactances and resistances of said transformer secondary winding, said electric circuit means, and said winding of said electroresponsive device being coordinated to obtain substantially maximum power supplied to said winding of said electroresponsive device.

CLAUDE D. HAYWARD.

CERTIFICATE OF CORRECTION.

Patent No. 2,374,994. May 1, 1945.

CLAUDE D. HAYWARD.

It is hereby certified that error appears in the printed specification of the above numbered patent requiring correction as follows: Page 1, second column, line 20, for "materal" read --material--; page 8, first column, line 37, claim 13, after the word "device" insert --, said winding of said electroresponsive device--; and that the said Letters Patent should be read with this correction therein that the same may conform to the record of the case in the Patent Office.

Signed and sealed this 31st day of July, A. D. 1945.

Leslie Frazer (Seal) Acting Commissioner of Patents.